(No Model.)

C. V. WOERD.
MACHINE FOR THREADING SECTIONAL LEADING SCREWS.

No. 293,930. Patented Feb. 19, 1884.

Witnesses.
C. P. Judd
A. L. White

Inventor.
C. V. Woerd
by Might & Brown
Attys

UNITED STATES PATENT OFFICE.

CHARLES V. WOERD, OF WALTHAM, MASSACHUSETTS.

MACHINE FOR THREADING SECTIONAL LEADING-SCREWS.

SPECIFICATION forming part of Letters Patent No. 293,930, dated February 19, 1884.

Application filed August 25, 1882. (No model.)

*To all whom it may concern:*

Be it known that I, CHARLES V. WOERD, of Waltham, in the county of Middlesex and State of Massachusetts, have invented certain Improvements in Leading-Screws and the Method of Cutting the Same, of which the following is a specification.

This invention relates to the manufacture of leading-screws to be used for purposes requiring the highest attainable degree of correctness in the cutting of the screw-threads of said screw—as, for example, in machines for ruling lines in glass plates to produce refraction gratings for the resolution of the lines of the solar spectrum, such machines being required to rule many thousands of lines on an inch of space by a marking device which is reciprocated over the glass plate and is fed by the action of a leading-screw after the formation of each line. Great difficulty has been experienced in constructing a leading-screw for this and other purposes, in which the thread is so nearly correct as to produce no perceptible variation in the microscopic spaces between the ruled lines or gratings. Heretofore leading-screws have been made by cutting the thread on a single rod or blank of the length which it is desired that the completed screw shall possess, said rod being held at its ends by centers on a lathe and threaded by a tool moved lengthwise of the rod by the leading-screw of the lathe. Various causes prevent the formation of a thread on the rod or blank, which is absolutely uniform and accurate from end to end of the rod. Among other causes are the variations of temperature from time to time, the imperfections of the operating leading-screw, the springing of the leading-screw and of the rod that is being threaded, and other unavoidable causes, all of which, although apparently trivial and producing only slight variations in the thread at different parts of the rod or blank, are of sufficient moment to be seriously considered when a screw of absolute accuracy is desired.

My invention has for its object to obviate the difficulties heretofore experienced in the production of accurate leading-screws; and to this end it consists in forming a leading-screw in short lengths or sections adapted to be secured together end to end to form a screw of the desired length, each section being threaded by a tool operated by a short leading-screw, so that the threads on all the sections are cut under the same conditions and exactly alike.

My invention also consists in the means employed for cutting the screw-sections.

Figure 1:
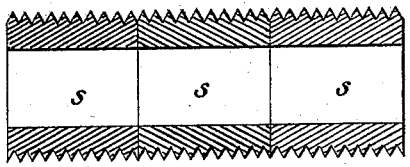
Figure 2:
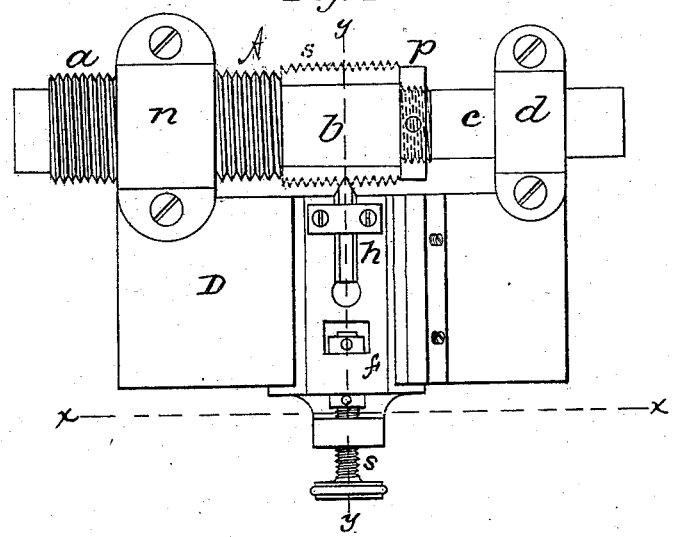
Figure 3:
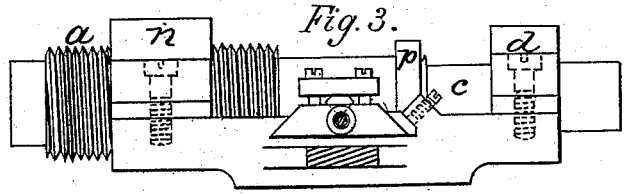
Figure 4:
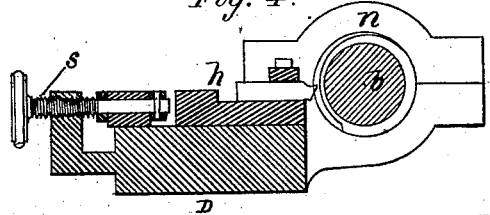

Of the accompanying drawings, forming a part of this specification, Figure 1 represents a longitudinal section, showing three sections placed end to end to form a complete screw. Fig. 2 represents a top view of the apparatus employed to thread the sections. Fig. 3 represents a section on line $x\ x$, Fig. 2. Fig. 4 represents a section on line $y\ y$, Fig. 2.

The same letters of reference indicate the same parts in all the figures.

In carrying out my invention, I construct a leading-screw, A, from any desired number of short tubular sections, $s\ s$, all threaded by the same means, as hereinafter described, and secured together end to end to form a continuous screw of the desired length by being mounted on a spindle and suitably secured thereto, preferably by means of a shoulder at one end of the series of sections and a nut bearing against the opposite end. The mechanism employed for threading the sections may be variously modified, provided it is adapted to cut threads exactly alike on all the sections, each section being cut separately by said mechanism. The mechanism shown in Figs. 2, 3, and 4 is the best which I have devised at the present. The same consists in an arbor, A, of peculiar construction, supported and rotated by any suitable means, as by the centers of a lathe and a plate, D, having a nut, $n$, and smooth-bored guide-collar, $d$, inclosing, respectively, threaded and smooth portions of said arbor. The plate D is provided with a slide, $f$, movable in guides toward and from the arbor A, said slide supporting the thread-cutting tool $h$, and being adjusted by a screw, $s$. The plate D may rest upon the ways of a lathe or be otherwise supported, so as to be capable of moving in a direction parallel with the arbor A. A portion, $a$, of the arbor A is provided with a screw-thread, which is engaged with the internal thread of the nut $n$, and, when the arbor is rotated, moves said nut with the plate D and tool $h$ in a direction parallel with the arbor, the portion $a$ being only of sufficient length to permit the nut-plate and tool-holder to be moved a distance equal to or but slightly in excess of the length of the section s to be cut. Another portion, b, of said arbor is turned to a size to receive one of the blank-sections s, the latter being secured firmly between the shoulder at the end of the portion a, and a tightening-nut, p, on a smaller threaded portion of the arbor. The remaining portion c of the arbor is turned to a suitable size to enter the guide-collar d. By revolving the arbor A the nut n is caused to move along the threaded portion a, drawing with it the plate D, with its slide and tool. The tool, being set, will cut on the blank-section s a thread exactly corresponding to that on the portion a of the arbor. One section s being cut, it is removed and all the others pass successively through the same operation on the arbor A. The rings are then mounted on a spindle properly adjusted and firmly secured together, thus making the screw ready for use.

It will be observed that by the use of the above-described mechanism the leading-screw which operates the thread-cutting tool and the section on which the thread is being cut are so closely connected that they are affected equally by changes of temperature, both expanding and contracting alike. Thus, if one section or series of sections are cut at a high temperature, the leading-screw thread a and the cut section or sections will expand, respectively, in a certain ratio, and if another section or series of sections are cut at a low temperature the leading-screw thread and cut section or sections will contract in the same ratio. If, now, a number of sections threaded at different temperatures are mounted on one spindle at a different temperature, the previous expansion and contraction will be modified, so that the thread on the sections will be equalized throughout the length of the screw, instead of varying at different points, as would be the case if the thread had been cut on a single rod or blank by the ordinary method under varying conditions of the temperature.

My invention is applicable not only to the production of exceptionally accurate screws for the purpose above named, but also for correcting lead-screws that have been previously cut.

I claim—

1. The improved mechanism for threading the screw-sections, composed of an arbor, A, having a short leading-screw, a, and adapted to hold a section to be threaded, and a plate, D, engaged with the screw a and supporting a cutting-tool, as set forth.

2. The plate D, carrying the nuts n d, the adjusting-screw s, and the adjustable slide f, in combination with the arbor A, composed of the screw-threaded portion a, the work-holder b, and the cylindrical portion c, substantially as and for the purposes set forth.

In testimony whereof I have signed my name to this specification, in the presence of two subscribing witnesses, this 19th day of August, 1882.

CHAS. V. WOERD.

Witnesses:
C. M. WHEATON,
C. F. BROWN.